United States Patent
Cofer

(10) Patent No.: US 7,768,549 B2
(45) Date of Patent: Aug. 3, 2010

(54) MACHINE SAFETY SYSTEM WITH MUTUAL EXCLUSION ZONE

(75) Inventor: Darren Duane Cofer, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 1723 days.

(21) Appl. No.: 09/877,362

(22) Filed: Jun. 8, 2001

(65) Prior Publication Data
US 2002/0186299 A1 Dec. 12, 2002

(51) Int. Cl.
*H04N 7/18* (2006.01)
(52) U.S. Cl. ...................... 348/152; 348/135
(58) Field of Classification Search .......... 348/82, 348/135, 143, 152–156, 159, 169, 86–93; 382/141, 145, 152, 154
See application file for complete search history.

(56) References Cited

U.S. PATENT DOCUMENTS

| | | | | |
|---|---|---|---|---|
| 5,047,752 A * | 9/1991 | Schorn | | 340/680 |
| 5,280,622 A | 1/1994 | Tino | | |
| 5,380,978 A * | 1/1995 | Pryor | | 219/121.64 |
| 5,504,520 A * | 4/1996 | Yamamoto | | 348/154 |
| 5,654,618 A * | 8/1997 | Roper | | 318/578 |
| 5,655,354 A * | 8/1997 | Baker et al. | | 53/474 |
| 5,731,832 A | 3/1998 | Ng | | 348/155 |
| 5,808,670 A * | 9/1998 | Oyashiki et al. | | 348/143 |
| 5,953,055 A | 9/1999 | Huang et al. | | 348/155 |
| 6,035,067 A | 3/2000 | Ponticos | | 382/226 |
| 6,195,121 B1 * | 2/2001 | Huang et al. | | 348/150 |
| 6,204,762 B1 * | 3/2001 | Dering et al. | | 340/541 |
| 6,297,844 B1 * | 10/2001 | Schatz et al. | | 348/43 |
| 6,481,083 B1 * | 11/2002 | Lawson et al. | | 29/407.04 |
| 6,494,363 B1 * | 12/2002 | Roger et al. | | 235/379 |
| 6,711,279 B1 * | 3/2004 | Hamza et al. | | 382/103 |
| 6,756,998 B1 * | 6/2004 | Bilger | | 715/764 |
| 6,829,371 B1 * | 12/2004 | Nichani et al. | | 382/103 |
| 2001/0041077 A1 * | 11/2001 | Lehner et al. | | 396/661 |
| 2002/0061134 A1 | 5/2002 | Hamza et al. | | |

FOREIGN PATENT DOCUMENTS

| EP | 0179252 A | 4/1986 |
|---|---|---|
| EP | 1168269 A2 | 5/2001 |

OTHER PUBLICATIONS

Aach, T., et al., "Statistical model-based change detection in moving video", *Signal Processing*, vol. 31, No. 2, pp. 165-180, Mar. 1993.
Hotter, M., et al., "Image Segmentation Based on Object Oriented Mapping Parameter Estimation", *Signal Processing*, vol. 15, No. 3, pp. 315-334, Oct. 1988.

(Continued)

*Primary Examiner*—David Czekaj

(57) ABSTRACT

A safety system receives access monitoring information from sensors to detect intrusion into a mutual exclusion zone by either an operator or mechanical equipment. The border of the mutual exclusion zone is segmented into portals that allow both the operator and equipment to access a common work area such as for loading material. When intrusion into one of the portals is detected, intrusion into any other selected portals triggers a safety violation. Access to the mutual exclusion zone via the other portals is prohibited until the interior of the zone is determined to be empty again.

18 Claims, 6 Drawing Sheets

OTHER PUBLICATIONS

Ostermann, J., "Modelling of 3D moving objects for an analysis-synthesis coder", *SPIE-SPSE: Symposium on Sensing and reconstruction of 3D objects and Scenes. Proc. SPIE 1260*, pp. 240-249, Santa Clara, CA, Feb. 1990.

Ostermann, J., "Segmentation of image areas changed due to object motion considering shadows", *Multimedia Communications and Video Coding*, pp. 241-246, Y. Wang, Ed., New York: Plenum, 1996.

Skifstad, K., et al., "Illumination Independent Change Detecton for Real World Image Sequences", *Computer Vision, Graphics, and Image Processing*, vol. 46, No. 3 pp. 387-399, Jun. 1989.

Stauder, J., "Segmentation of moving objects in presence of moving shadows", *Proc. Int. Workshop on Coding Techniques for Very Low Bit Rate Video*, Linkoping, Sweden, Jul. 28-30, 1997, pp. 41-44.

Stauder, J., et al., "Detection of Moving Case Shadows for Object Segmentation", *IEEE Trans. on Multimedia*, vol. 1., No. 1, pp. 65-76, Mar. 1999.

Venkatseh, S., "Dynamic Threshold Determination by Local and Global Edge Evaluation", *Graphical models and image procession*, vol. 57, No. 2, pp. 146-160, Mar. 1995.

Weszka, J.S., "SURVEY: A Survey of Threshold Selection Techniques", *Computer Graphics and image Processing 7*, pp. 259-265, 1978.

Xiong, W., et al., "Efficient Scene Change Detection and Camera Motion Annotation for Video Classification", *Computer vision and image understanding*, vol. 71, No. 2, pp. 166-181, Aug. 1998.

\* cited by examiner

MACHINE SAFETY SYSTEM WITH MUTUAL EXCLUSION ZONE

REFERENCE TO RELATED APPLICATIONS

The present application is related to commonly assigned U.S. Patent Application for "Object Detection" filed Nov. 17, 2000 having Ser. No. 09/716,002, issued as U.S. Pat. No. 6,711,279, and incorporated herein by reference.

FIELD OF THE INVENTION

The present invention relates to machine safety, and in particular to a machine safety system with a mutual exclusion zone.

BACKGROUND OF THE INVENTION

Operators of hazardous equipment are subjected to many dangers from the equipment they operate. Various safety devices have been used to try and protect the operator and others from the hazardous equipment. Electrosensitive protection equipment is widely used in industrial settings to protect operators of hazardous equipment from injury. Such devices consist of a sensing function, a control or monitoring function, and an output signal switching device. The sensing function collects data from a defined safety zone surrounding the dangerous equipment. The safety zone may be a line, an area or volume, depending on the sensing technology used. When the control function determines that the sensor data provided by the sensing function corresponds to an intrusion into the safety zone, an output signal is produced that may either sound an alarm or deactivate the hazardous equipment.

A variety of electrosensitive protection equipment is commercially available, including single beam photodetectors. This type of device uses a light source and detector and provides access monitoring. Interruption of the beam due to crossing the line between the source and detector triggers a safety violation. A light curtain consists of an array of emitter/detector pairs. They are normally mounted in a pair of enclosures monitoring a vertical plane between the enclosures providing access monitoring of the penetration of a rectangular plane. Further devices comprise laser scanners, safety mats and safety cameras. A safety camera uses images obtained from a video camera to detect intrusion into the safety zone. It provides both access and presence monitoring by separately analyzing the border of the safety zone and the interior of the safety zone.

Current electrosensitve protection equipment is designed to prevent injury by deactivating potentially hazardous equipment whenever any object enters the monitored safety zone. This means that the equipment is disabled while the operator is present in the safety zone and it cannot perform other tasks. In many applications it is necessary for both human operators and automated equipment to have access to a shared work area, such as for loading and unloading of material. In some instances, a muting function is included to temporarily disable the safety function while the machine or material enters the safety zone. This is typically used in conveyor application where it is desirable to admit material carried by the conveyor but still exclude human intrusion. It normally requires the use of additional sensors that can distinguish between humans and the admitted material on the basis of size or velocity.

There is a need for a safety mechanism that protects the operator and others from hazardous equipment. There is a need for such a system that does not interfere with the normal operation of the equipment. There is yet a further need for a safety mechanism that allows safe shared access to a zone by both the machine and an operator.

SUMMARY OF THE INVENTION

A system receives access monitoring information from sensors to detect intrusion into a mutual exclusion zone by either an operator or mechanical equipment. The border of the mutual exclusion zone is segmented into portals that allow both the operator and equipment to access a common work area such as for loading material. When intrusion into one of the portals is detected, intrusion into other selected portals triggers a safety violation. Access to the mutual exclusion zone via the other portals is prohibited until the interior of the zone is determined to be empty again.

In one embodiment, when an intrusion is detected into one portal, a set of other portals is added to a trigger list. If an intrusion is then detected into a portal on the trigger list, the safety violation is generated. The trigger list may be a subset of portals, or may include all other portals than the one having the first intrusion.

In a further embodiment, a safety camera is used to detect if the interior of the zone is empty. Image processing techniques are performed based on images from the camera to detect motion and other changes in images from a baseline image. Upon determining the zone is empty, the trigger list is cleared, and monitoring for intrusion into any portal is begun again. The safety camera also provides information regarding intrusion into the portals. In yet a further embodiment, sets of photo detectors, laser sensors, motion sensors or other sensors are used to detect intrusion into portals.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
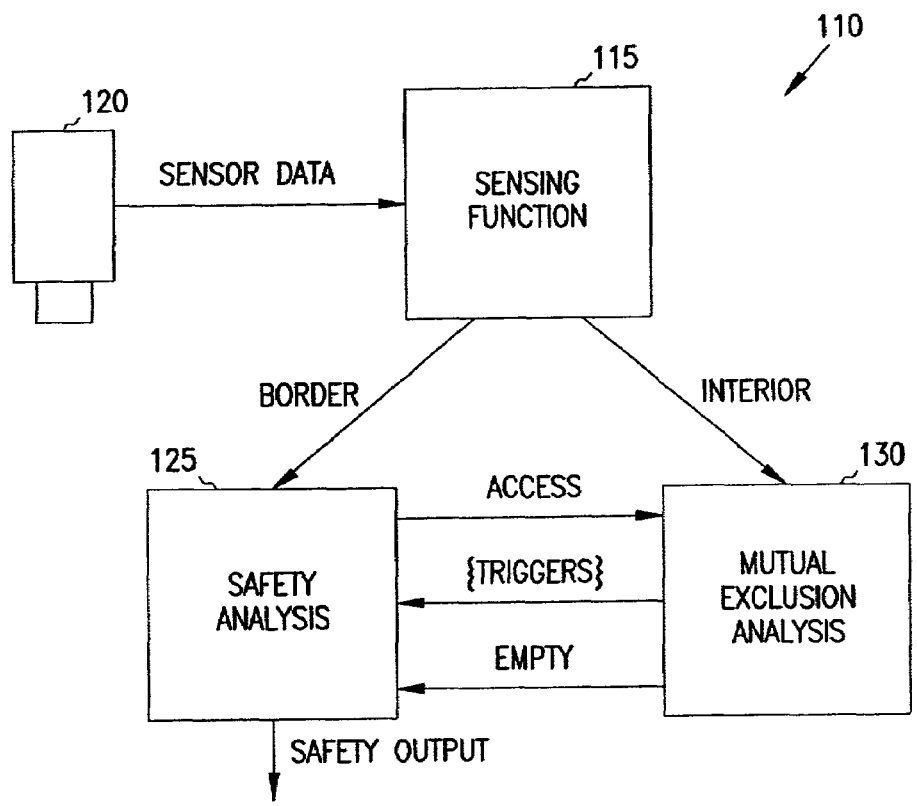
FIG. 1 is a block diagram of a mutual exclusion safety system.

A block diagram of a mutual exclusion system is shown generally at 110 in FIG. 1. A sensing function 115 receives input from a sensor 120 such as a video or safety camera which monitors an area or volume referred to as a mutual exclusion zone. This is a zone that is predetermined as an area where both a machine and an operator should not be working at the same time. It represents a zone where injury to the operator might occur. The mutual exclusion zone may also be defined larger to provide some margin of error. The zone is bounded by a segmented boundary. Each segment is referred to as a portal.

Sensor 120 senses changes caused by either the operator or the machine enters a portal. Information from sensor 120 is provided to a safety analysis function 125 which determines whether the border of the interior has been disturbed. Sensor 120 also detects whether the operator or machine is still present in the interior of the zone, and provides that information to a mutual exclusion analysis function 130. The safety analysis function 125 provides access information regarding intrusion into a portal to the mutual exclusion analysis function 130. The mutual exclusion analysis function 130 provides a list of trigger portals and an empty indication to the safety analysis function 125. Safety analysis function 125 uses the trigger list to compare to further intrusions into other portals, and when a further intrusion into a portal on the trigger list occurs, generates a safety violation output. This output is used to sound an alarm or warning, and to stop operation of the machine to prevent injury to the operator.

The safety analysis function and mutual exclusion function are combined into a single function or yet further multiple functions in alternate embodiments, and is performed using software on a general purpose computer. In further embodiments, various combinations of hardware, software and firmware are utilized to perform the functions.

The sensing function monitors the protected mutual exclusion zone and provides access and presence monitoring information. It determines when there is an access violation on any of a set of defined segments of the border of the zone. It also determines when there is any presence violation in the interior of the zone. This is provided continually or only on request. In one embodiment, the sensor 120 is a video or a safety camera, and the sensing function contains image analysis software/hardware comprising an object detection system as described in more detail below.

In a further embodiment, the object detection system detects motion in accordance with MPEG standards. The motion is compared to the locations of the segments to generate the signals. The image analysis software/hardware is also used to compare current images to a baseline image to determine potential presence in the interior of the zone.

Figure 2:
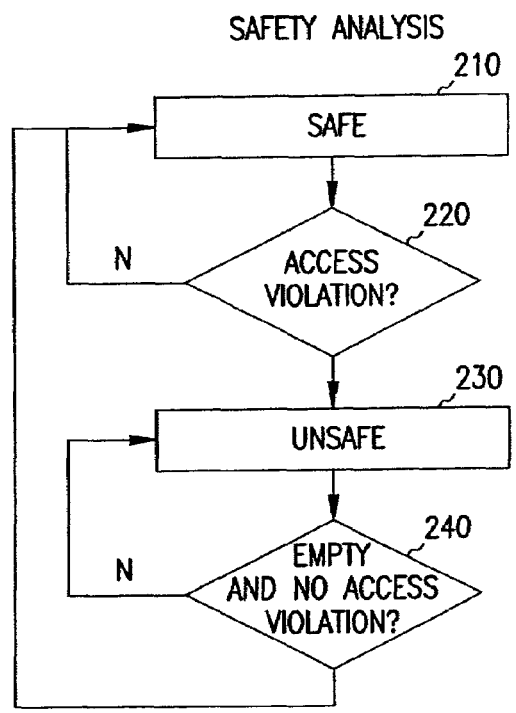
FIG. 2 is a flow chart showing a safety analysis for determining when further operation of a machine is safe.
Figure 3:
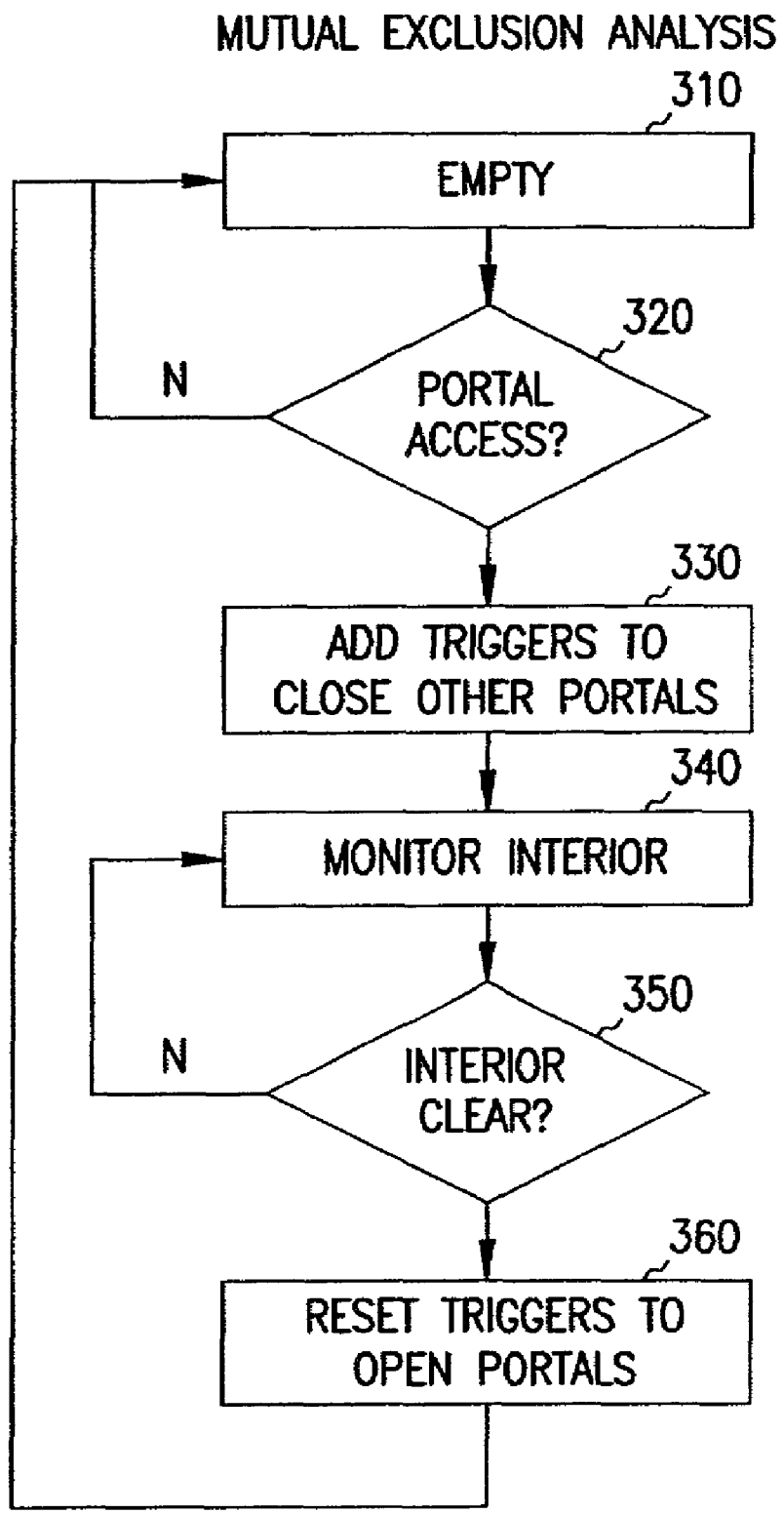
FIG. 3 is a flow chart showing operation of a mutual exclusion analysis function.

Further detail regarding operation of the safety analysis function is provided with respect to the flowchart of FIG. 2. Functions described herein are implemented in software in one embodiment, where the software comprises computer executable instructions stored on computer readable media such as non-volatile memory. The safety analysis function is responsible for determining the state of the safety output based on inputs from the sensing function and the mutual exclusion analysis function. The sensing function provides the state for each segment of the border. At 210, the state is initiated as safe. At 220, access violations are analyzed. If no access violation has been received, the state is still safe, and the system continues to wait for an access violation.

If an access violation is detected, the system is deemed unsafe at 230. Details regarding the access violation, including the portal intruded upon, is provided to the mutual exclusion analysis function. The mutual exclusion analysis function provides the 'empty' signal to the safety analysis function at 240. It does so based on data from the sensing function. This is because the mutual exclusion analysis function may need to know the state of the interior at times when the safety analysis function is still in the 'safe' state. Since the interior analysis is likely to be computationally expensive, it is only performed on demand in one embodiment. Since the demand of the mutual exclusion function is a strict superset of the demand of the safety function, the mutual exclusion function manages requests for the interior analysis. If no access violation is currently occurring, the system state is changed to safe at 210, and access violations are monitored at 220.

The mutual exclusion analysis function provides a list of border segments that should be used to trigger a safety violation. This list is updated based on the state of the mutual exclusion zone. It also provides a signal to indicate when the interior of the zone has been determined to be empty.

The mutual exclusion analysis function is responsible for determining the state of the mutual exclusion zone based on inputs from the sensing function and the safety analysis function. The state is "empty" at the start of the function 310. The sensing function provides the state of the interior of the zone. The safety analysis function provides the segment that has been accessed, which is used at 320 to determine if the state has changed. If not, the state continues at empty 310. A user-configured function defines the segments of the border through which access to the mutual exclusion zone should be permitted (the portals) at 330. This is used to determine a list of trigger segments that should trigger a safety violation at any time and when the interior of the zone should be monitored at 340. The mutual exclusion analysis function receives input from the sensing function at 340 regarding whether the interior has become clear. If not, as determined at 350, monitoring of the interior continues at 340. If it has become clear, the trigger portals are reset to open.

The safety analysis function receives the trigger list from the mutual exclusion analysis function and uses it to determine whether there is an access violation at 240. As previously indicated, if none, or if the zone is found to be empty, the state is returned to safe. If however, an additional access or intrusion occurred into a portal on the trigger list a safety output is raised to indicate that there has been a safety violation and an alarm is sounded and/or the equipment is shut off quickly to prevent possible injury.

Further detail of the mutual exclusion analysis function and its interaction with the safety analysis function is now provided. The border of the mutual exclusion zone is partitioned into a set of segments, $B=\{s^1, \ldots s^n\}$. Portals are defined as a subset of border segments, P is a subset of B, where access is permitted. A trigger function f, $f:P \rightarrow 2^P$, defines the set of portals to be closed when access is detected at each portal. Normally, f is defined to close all portals other than the one accessed, so $f(s_i)=P-\{s_i\}$.

$T_o$ is the set of segments that always trigger a safety violation. Initially, $T_o=B-P$. T is the current set of segments that trigger a safety violation. Initially, $T=T_o$. When a portal access is detected, the portals to be closed (defined by the trigger function f) are added to T. That is, $T=T_o$ union $f(s_i)$. When the zone is again determined to be empty, the set of triggers is reset to $T=T_o$. Any time that a safety violation occurs, the entire border is added to the trigger list, setting T=B, to ensure that the zone becomes completely empty with no additional access allowed before returning to the safe operation. Similarly, if simultaneous access is detected at two or more portals, a safety violation is triggered setting T=B. On returning to the safe state, the trigger list is reset to T=$T_o$.

Figure 5:
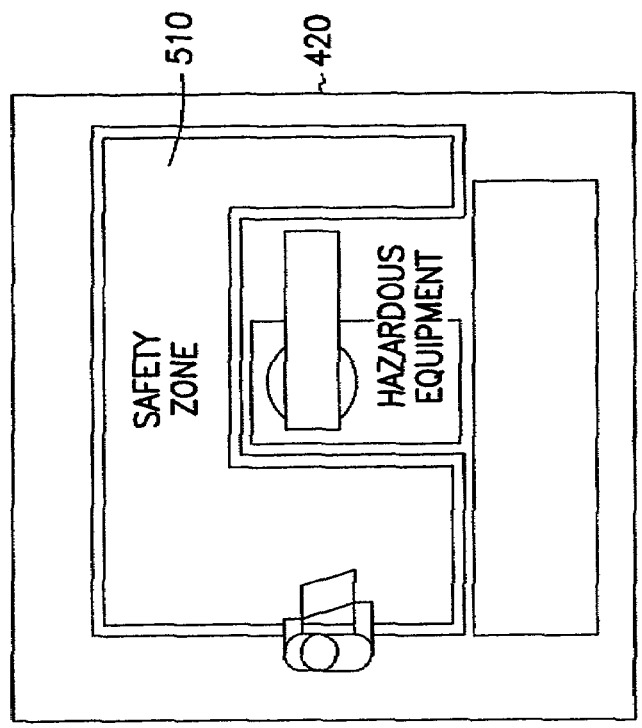
FIG. 5 is a block top view of the setup of FIG. 4.
Figure 4:
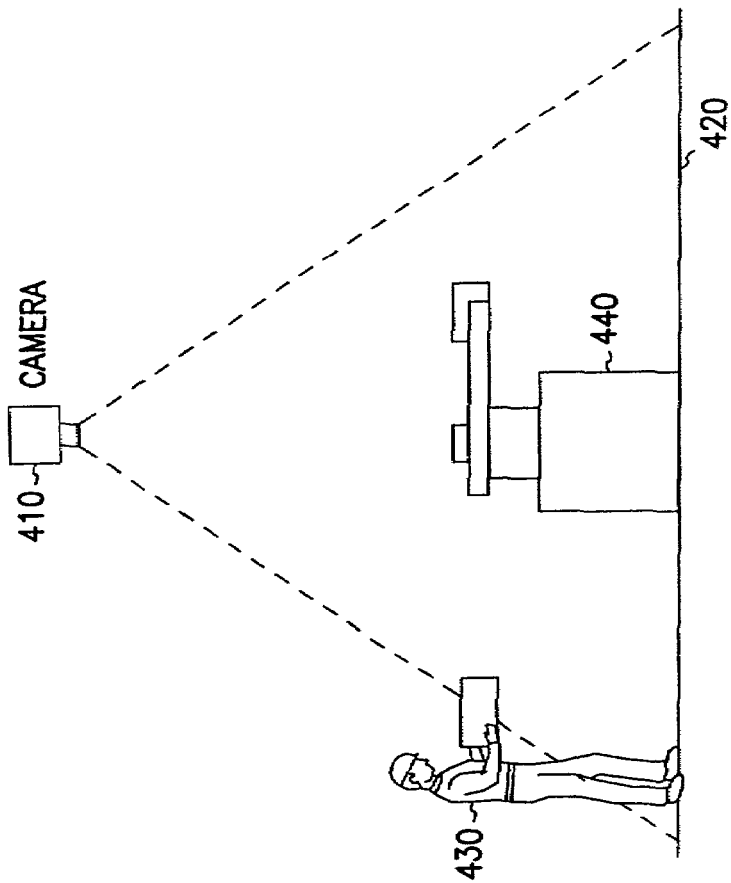
FIG. 4 is a block side view of a safety camera setup used to monitor intrusions into a safety zone surrounding hazardous equipment.

One embodiment of the use of the safety system in an industrial environment is shown in cross section in FIG. 4. A safety camera 410 is placed above a work area 420 to monitor a mutual exclusion zone or safety zone, better shown at 510 in a top view of the work area in FIG. 5. The safety zone 510 is "U" shaped in this embodiment because an operator 430 is not able to access a machine 440 from the open end of the U. The safety zone is tailored for each machine environment and desired amount of safety. The speed and time required to stop the machine may also be factored into the size of the safety zone. In FIG. 4, the safety zone is pyramid like with a base occupying a region of the floor surrounding the hazardous equipment.

The camera 410 or other image capturing device captures images and passes them to an analysis device, which may be located with the camera, included within a body of the camera, or remotely located there from. A microcontroller or embedded computing device having high reliability may also be suitably programmed to receive and process the images. The analysis device contains the sensing, safety analysis and mutual exclusion functions. Images are processed to detect intrusion into the mutual exclusion zone by either the operator or mechanical equipment 440.

One method of processing images comprises an object detection system as described in co-pending, commonly assigned U.S. patent application for "Object Detection" filed Nov. 17, 2000 having Ser. No. 09/716,002 and incorporated herein by reference. In such Application, portions of a patterned background are analyzed to determine whether an object exists in any of the portions. Each portion of the patterned background is referred to as a mask window. The size of the mask window is designed so that it is no larger than the approximate size of the smallest object for which detection is desired. Mask windows are overlapped in a manner so as to cover the area for which object detection is desired. The patterned background is designed so that each mask window contains both light areas and dark areas. In one embodiment, the patterned background is designed so that in each mask window the amount of light area and amount of dark area is approximately equal.

The object detection system takes advantages of certain phenomena that occur when a live image is compared to a reference image exhibiting a patterned background. First, a difference image produced by subtracting the reference image from a live image containing an object will contain a complement or inverse image of the object. Second, live images containing shadows instead of objects tend to not produce any complements or inverse images in a difference image.

Because the overall background pattern and the position of each mask window are known and do not change during object detection, the background pattern within each mask window is known and is constant. Thus, certain calculations corresponding to each reference image can be made once during initialization of the object detection system and then used as constants during analysis of a live image. This use of constants calculated at initialization allows for faster image analysis at run time, which in turn allows image capture devices with faster frame rates to be used.

An object is detected when the difference between the expected value for the brightness levels in the portion of the live image corresponding to the portion of the reference image containing light pixels and the expected value for the brightness levels in the portion of the live image corresponding to the portion of the reference image containing dark pixels is less than some threshold T.

The border of the safety zone is segmented into portals that allow both the operator and the equipment to access a common work area, such as for loading material. When intrusion into one of the portals is detected, intrusion into any other portal will trigger a safety violation. Access to the zone via the other portals is prohibited until the interior is determined to be empty again. In the embodiment shown in FIG. 5, both the interior and the exterior of the U shaped zone are comprised of one or more portals.

Figure 6:
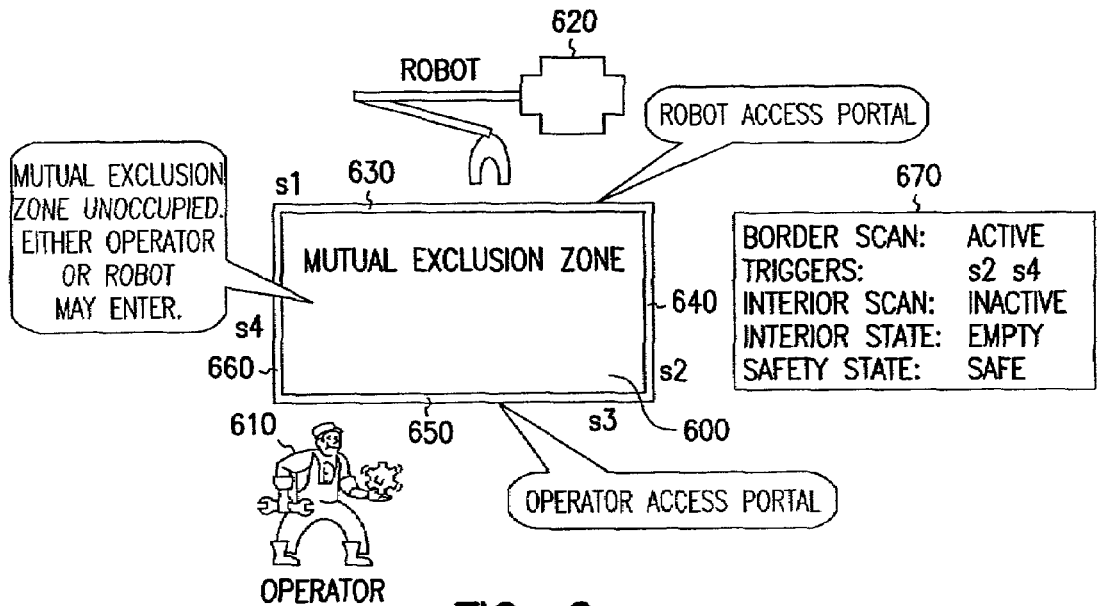
FIG. 6 is a block diagram of a mutual exclusion zone for a robot and operator.

FIGS. 6-10 illustrate operation of the mutual exclusion function in one embodiment. FIG. 6 shows the initial state of a system with a mutual exclusion zone 600 unoccupied. An operator 610 and robot 620 are both shown outside the zone 600. Zone 600 is segmented into four segments or portals, S1, S2, S3, and S4 indicated at 630, 640, 650 and 660 respectively. The portals are set up so that the operator has only one portal to enter, S3. Entry through S2 or S4 will result in an immediate safety violation. Those portals are currently on the trigger list. A chart 670 shows the status of several variables or registers. Border scan is active, triggers include S2 and S4, interior scan is inactive, interior state is empty, and a safety state is safe.

Figure 7:
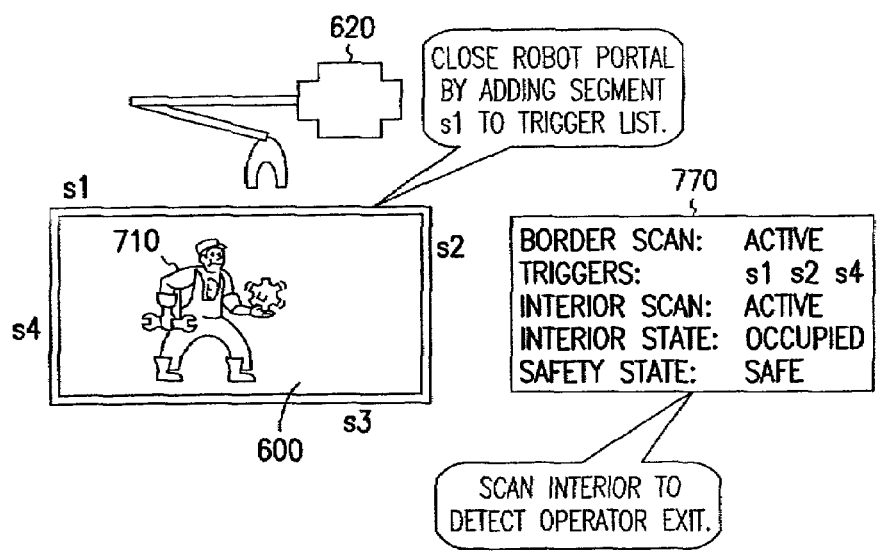
FIG. 7 is a block diagram of the mutual exclusion zone of FIG. 6 when an operator is within the zone.

In FIG. 7, an operator 710 has entered zone 600 via portal S3. This causes the robot portal, S1, to be added to the trigger list, as S1 is the only portal the robot is able to enter. Subsequent access via any of the segments in the trigger list will cause a safety violation. In addition, the interior monitoring function is now active and has determined that the zone is occupied as indicated at 770. The system state is still safe since only one object, the operator 710, has attempted to enter the mutual exclusion zone. When the operator exits the zone through S3, the system will again return to the initial state shown in FIG. 6.

Figure 8:
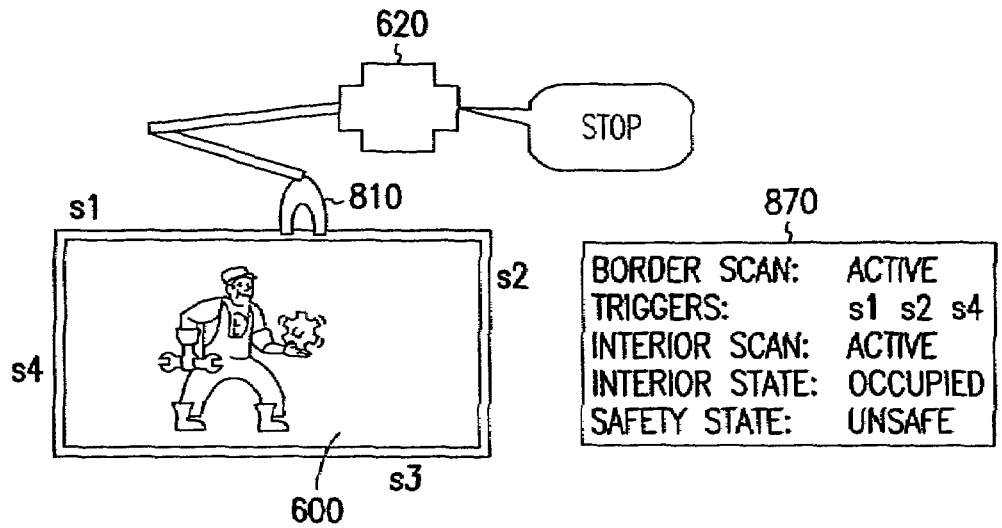
FIG. 8 is a block diagram of the mutual exclusion zone of FIG. 6 when an operator is within the zone and a robot arm is attempting to enter the zone.

FIG. 8 shows the robot 620 moving an arm 810 into the mutual exclusion zone 600 via its portal, S1. When the robot arm 810 crosses S1, this triggers an access violation and the system switches to the unsafe state as shown in 870, stopping the robot. At this point, the robot and the operator must completely withdraw from the mutual exclusion zone before safe operation can resume.

Figure 9:
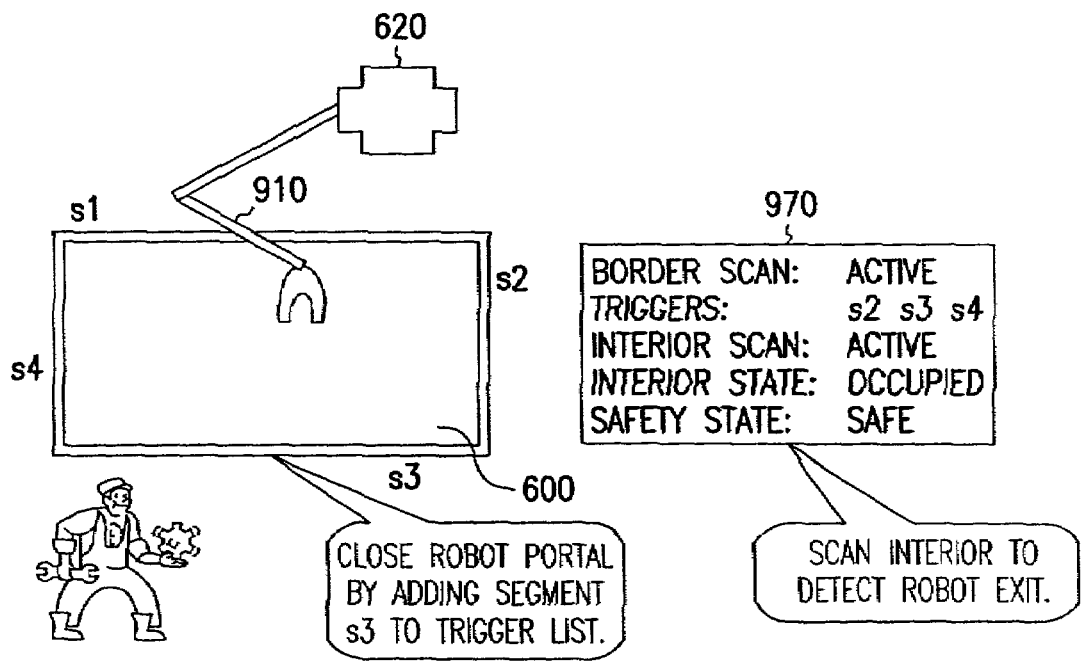
FIG. 9 is a block diagram of the mutual exclusion zone of FIG. 6 when a robot arm is within the zone.

After the system has restarted, FIG. 9 shows the robot arm 910 entering the mutual exclusion zone via its portal S1. This causes the operator portal, S3, to be added to the trigger list as shown in 970. Subsequent access via any of the segments in the trigger list cause a safety violation. In addition, the interior monitoring function is now active and has determined that the zone is occupied. The system state is still safe since only one object, the robot arm, has attempted to enter the mutual exclusion zone 600. When the robot arm 910 exits the zone through S1, the system returns to the initial state shown in FIG. 6.

Figure 10:
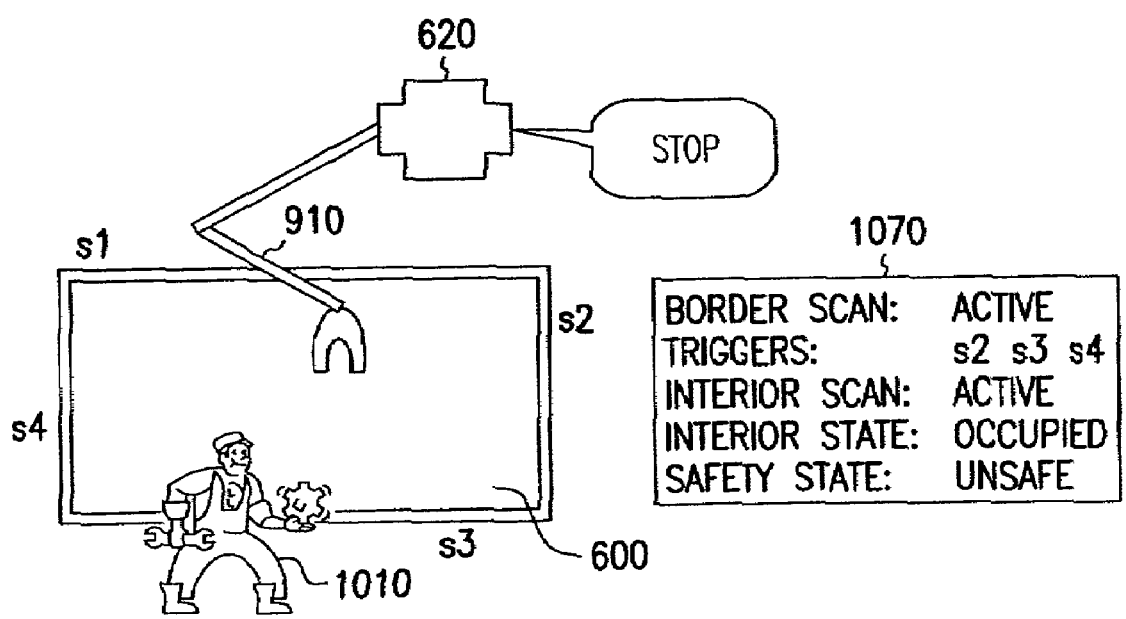
FIG. 10 is a block diagram of the mutual exclusion zone of FIG. 6 when a robot arm is within the zone and an operator is entering the zone.

FIG. 10 shows an operator 1010 attempting to access the mutual exclusion zone while the robot is still in it. When the operator crosses S3, this triggers an access violation and the system switches to the unsafe state shown at 1070, stopping the robot arm 910. At this point the robot and the operator must completely withdraw from the mutual exclusion zone before safe operation can resume. If the robot is within the zone when a safety violation occurs, a manual override input grants access via the robot portal prior to the zone first becoming empty. In practice, this input would requires a supervisor password or key because the person triggering the input is taking responsibility for there being no human operators in the zone.

The invention claimed is:

1. A mutual exclusion mechanism for a hazardous machine, wherein at least a portion of the machine and at least a portion of an operator can move into and out of a mutual exclusion zone during operation of the machine, but not at the same time, the mechanism comprising:
   a sensor that detects a first entrance of one of the portion of the operator or the portion of the machine into the mutual exclusion zone via any of a plurality of border segments bordering the mutual exclusion zone, wherein the sensor and the mutual exclusion zone do not move with the moving portion of the machine; and
   a controller that receives information from the sensor regarding the first entrance into the mutual exclusion zone, and controls the machine based on a second entrance of the portion of the operator or the portion of the machine into the mutual exclusion zone via a second segment bordering the mutual exclusion zone, wherein when a portion of the operator enters the mutual exclusion zone the controller prevents a portion of the machine from entering the mutual exclusion zone until the portion of the operator exits the mutual exclusion zone, at which time the controller allows the portion of the machine to enter the mutual exclusion zone.

2. The mutual exclusion mechanism of claim 1 wherein the sensor comprises multiple sensors.

3. The mutual exclusion mechanism of claim 1 wherein the sensor comprises a safety camera.

4. The mutual exclusion mechanism of claim 1 wherein the sensor also detects the presence of one of the portion of the operator or the portion of the machine within the mutual exclusion zone.

5. The mutual exclusion mechanism of claim 1 wherein the controller tracks multiple states of the mutual exclusion zone selected from the group consisting of safe, empty and unsafe.

6. A mutual exclusion mechanism for a hazardous machine, wherein at least a portion of the machine and at least a portion of an operator can move into and out of a mutual exclusion zone during operation of the machine, the mechanism comprising:
   a sensor that detects a first entrance of one of the portion of the operator or the portion of the machine into the mutual exclusion zone via any of a plurality of border segments bordering the mutual exclusion zone, wherein the sensor and the mutual exclusion zone do not move with the moving portion of the machine;
   a controller that receives information from the sensor regarding the first entrance into the mutual exclusion zone, and controls the machine based on a second entrance of the portion of the operator or the portion of the machine into the mutual exclusion zone via a second segment bordering the mutual exclusion zone; and
   wherein the controller generates a trigger list of further segments bordering the mutual exclusion zone when one of the portion of the operator or the portion of the machine have entered the mutual exclusion zone via one segment.

7. The mutual exclusion mechanism of claim 6 wherein entrance by a second of the portion of the operator or the portion of the machine into a segment on the trigger list results in generation of a safety violation.

8. The mutual exclusion mechanism of claim 6 wherein some segments are on the trigger list prior to any segment being entered.

9. A mutual exclusion mechanism for a hazardous machine, wherein at least a portion of the machine and at least a portion of an operator can move into and out of a mutual exclusion zone during operation of the machine, the mechanism comprising:
   a sensor that detects a first entrance of one of the portion of the operator or the portion of the machine into the mutual exclusion zone via any of a plurality of border segments bordering the mutual exclusion zone, wherein the sensor and the mutual exclusion zone do not move with the moving portion of the machine;
   a controller that receives information from the sensor regarding the first entrance into the mutual exclusion zone, and controls the machine based on a second entrance of the portion of the operator or the portion of the machine into the mutual exclusion zone via a second segment bordering the mutual exclusion zone; and
   wherein the sensor also detects the presence of one of the portion of the operator or the portion of the machine within the mutual exclusion zone, the controller generates a trigger list of further segments bordering the mutual exclusion zone when one of the portion of the operator and the portion of the machine have entered the mutual exclusion zone via one segment, and wherein entrance by a second of the portion of the operator or the portion of the machine into a segment on the trigger list results in generation of a safety violation.

10. A method for detecting an object entering a region of interest and controlling entry of objects into the region of interest, the method comprising:
   providing a controller and a sensor;
   the controller defining a border of the region of interest;
   the controller defining two or more border segments of the border;
   the controller identifying a set of permissible border segments through which access to the region is permissible;
   the sensor sensing when a permissible segment of the border has been crossed; and
   the controller determining the set of permissible border segments through which further access to the region is permissible based on which segment of the border has already been crossed.

11. The method of claim 10 wherein after the region of interest has been accessed via a border segment, the set of border segments through which further access to the region is permissible only includes the border segment through which the region of interest has already been accessed.

12. The method of claim 10 further comprising:
   the controller restoring the set of permissible border segments through which access to the region of interest is permissible to its initial state when the sensor senses that the interior of the region of interest is no longer occupied.

13. The method of claim 12 wherein the sensor includes a camera and the border crossing and occupancy determinations are made using the camera.

14. A method of controlling a machine, wherein at least a portion of the machine and at least a portion of an operator can move into and out of a predefined mutual exclusion zone during operation of the machine, but not at the same time, the method comprising:
   providing a controller and a sensor;
   detecting with the sensor whether the portion of the operator or the portion of the machine have entered the predefined mutual exclusion zone;
   if the sensor has detected that the portion of the operator or the portion of the machine has entered the mutual exclusion zone, monitoring with the sensor whether one of the portion of the operator or the portion of the machine are still in the predefined mutual exclusion zone; and if one of the portion of the operator or the portion of the machine are still in the predefined mutual exclusion zone, controlling the machine with the controller based on the entrance of the other of the portion of the operator or the portion of the machine into the predefined mutual exclusion zone such that only one of either the portion of the operator or the portion of the machine are positioned within the predefined mutual exclusion zone at any given time, such that if a portion of the operator is in the mutual exclusion zone, the controller prevents the machine from entering the mutual exclusion zone until the portion of the operator leaves the mutual exclusion zone, at which time the controller allows the machine to enter the mutual exclusion zone.

15. A method of detecting a hazardous condition for an operator of a machine, wherein at least a portion of the machine and at least a portion of the operator can move into and out of a fixed mutual exclusion zone during operation of the machine, but not at the same time, the method comprising:

monitoring the fixed mutual exclusion zone with a sensor;

detecting with the sensor whether the portion of the operator or the portion of the machine have entered the fixed mutual exclusion zone;

if the sensor has detected that the portion of the operator or the portion of the machine has entered the fixed mutual exclusion zone, monitoring whether one of the portion of the operator or the portion of the machine are still in the fixed mutual exclusion zone; and if one of the portion of the operator or the portion of the machine are still in the fixed mutual exclusion zone, a controller generating a signal based on the entrance of the other of the portion of the operator or the portion of the machine into the fixed mutual exclusion zone;

wherein once the portion of the operator or the portion of the machine leaves the fixed mutual exclusion zone, the other of the portion of the operator or the portion of the machine are allowed to enter the fixed mutual exclusion zone.

16. The method of claim 15 wherein the signal comprises a stop machine signal or a safety warning signal.

17. An apparatus for controlling the operation of a machine, wherein at least a portion of the machine and at least a portion of an operator can move into and out of a defined mutual exclusion zone during operation of the machine, but not at the same time, comprising:

a detector for detecting whether the portion of the operator or the portion of the machine have entered the defined mutual exclusion zone;

a controller coupled to the detector for monitoring whether one of the portion of the operator or the portion of the machine are still in the defined mutual exclusion zone, and if one of the portion of the operator or the portion of the machine are still in the mutual exclusion zone, deactivating the machine if the other of the portion of the operator or the portion of the machine enter into the defined mutual exclusion zone, wherein if the portion of the operator enters the mutual exclusion zone and then exits, the controller allows the portion of the machine to enter the mutual exclusion zone.

18. A mutual exclusion mechanism for a hazardous machine, wherein at least a portion of the machine and at least a portion of an operator can move into and out of a predefined mutual exclusion zone during operation of the machine, but not at the same time, the mechanism comprising:

a sensor that detects a first entrance of one of the portion of the operator or the portion of the machine into the predefined mutual exclusion zone; and a controller that receives information from the sensor regarding the first entrance into the mutual exclusion zone, and deactivates the machine based on a second entrance of the portion of the operator or the portion of the machine into the mutual exclusion zone such that the machine is activated when only one of either the portion of the machine or the portion of the operator are within the predefined mutual exclusion zone.

* * * * *